United States Patent
Dallal

(10) Patent No.: US 7,245,669 B2
(45) Date of Patent: Jul. 17, 2007

(54) DUAL POLARITY CODING SYSTEM AND METHOD FOR A MILLIMETER WAVE COMMUNICATION SYSTEM

(75) Inventor: Yeheskal Dallal, Kfar Saba (IL)

(73) Assignee: Millimetrix Broadband Networks Ltd., Kibbutz Eyal (IL)

(*) Notice: Subject to any disclaimer, the term of this patent is extended or adjusted under 35 U.S.C. 154(b) by 688 days.

(21) Appl. No.: 10/412,328

(22) Filed: Apr. 14, 2003

(65) Prior Publication Data

US 2004/0202255 A1 Oct. 14, 2004

(51) Int. Cl.
*H04L 27/04* (2006.01)

(52) U.S. Cl. .................. 375/299; 375/267; 375/265

(58) Field of Classification Search .......... 375/229, 375/261, 265, 299, 267
See application file for complete search history.

(56) References Cited

U.S. PATENT DOCUMENTS

| | | | |
|---|---|---|---|
| 6,285,681 B1* | 9/2001 | Kolze et al. | 370/442 |
| 6,553,539 B1* | 4/2003 | Markarian et al. | 714/790 |
| 6,594,792 B1* | 7/2003 | Hladik et al. | 714/755 |
| 6,606,724 B1* | 8/2003 | Krieger et al. | 714/755 |
| 6,961,388 B2* | 11/2005 | Ling et al. | 375/267 |
| 6,985,537 B1* | 1/2006 | Milbar | 375/265 |
| 2003/0031233 A1* | 2/2003 | Kim et al. | 375/146 |
| 2003/0079170 A1* | 4/2003 | Stewart et al. | 714/755 |

FOREIGN PATENT DOCUMENTS

| | | |
|---|---|---|
| WO | WO02/15456 | 2/2002 |
| WO | WO02/19591 | 3/2002 |

OTHER PUBLICATIONS

Proakis, Digital Communications, 3$^{rd}$ edition, McGraw-Hill International Editions 1995.
Telatar, "Capacity of Multi-Antenna Gaussian Channels" Eur Trans Telecom vol. 10 pp. 585-595 Nov. 1999.
Foschini, "Layered space-time architecture for wireless communication in fading environment when using multi-element antennas" Bell Labs Tech Journal (Autumn 1996) vol. 1, No. 2.
Amitay et al; "Linear equalization theory in digital data transmission over dually polarized fading radio channels" AT&T Tech j vol. 63, No. 10 Part 1, pp. 2215-2259 Dec. 1984.

* cited by examiner

*Primary Examiner*—Temesghen Ghebretinsae
(74) *Attorney, Agent, or Firm*—Mark M Friedman

(57) ABSTRACT

A method and system for efficient dual polarity transmission of a millimeter wave data stream of overall rate $R_{fixed} + R_{var} + R_{MAC}$ through two channels of polarities H and V. The method comprises the steps of determining asymmetric H and V transmission powers such that the overall rate $R_{fixed} + R_{var} + R_{MAC}$ is maximized, determining asymmetric $\eta_H$ and $\eta_V$ spectral efficiencies according to the asymmetric H and V transmission powers, and determining asymmetric coding and interleaving parameters related to the asymmetric $\eta_H$ and $\eta_V$ spectral efficiencies.

12 Claims, 3 Drawing Sheets

DUAL POLARITY CODING SYSTEM AND METHOD FOR A MILLIMETER WAVE COMMUNICATION SYSTEM

TECHNICAL FIELD OF THE INVENTION

The invention relates to point-to-point, line-of-sight communications, and more specifically to millimeter wave (MMW) communications.

BACKGROUND OF THE INVENTION

With continued growth in demand for electronic communications of all kinds, and with spectrum being a finite resource, interest has arisen in finding techniques for improving the spectral efficiency of point-to-point, line-of-sight MMW communications. One such technique is to increase the constellation size of the modem, see J. G. Proakis, *Digital Communications*, 3rd Edition, McGraw-Hill International Editions, 1995; however, there is a practical limit to the size of the constellation that can be used in MMW communications, and constellations higher than 256 have been found to be impractical. Another technique is to utilize multiple antenna systems in combination with some mechanism to create channel discrimination, as described for example in I. E. Telatar, "Capacity of multi-antenna Gaussian channels," *Eur. Trans. Telecom.*, vol. 10, pp 585-595, November 1999, in G. J. Foschini, "Layered space-time architecture for wireless communication in fading environment when using multi-element antennas," *Bell Labs Tech. J.*, vol. 1, no. 2, pp. 41-59, 1996, and in N. Amitay and J. Salz, "Linear equalization theory in digital data transmission over dually polarized fading radio channels," *AT&T Tech. J.*, vol. 63, no. 10, Part 1, pp. 2215-2259, December 1984. One example in Telatar above describes the use of multiple antennas in microwave systems, where the channel discrimination is achieved by differential fading effects that each of the radio paths experience. Another example is the use of multiple antennas in MMW communication, described generally in PCTJ/S01/24913 filed Aug. 9, 2001, and PCT/IL01/00820 filed Aug. 30, 2001, where channel discrimination is achieved by the geometric structure of the arrays. However, both Telatar and the two PCT applications above require a (relatively) large physical separation between the antennas, depending on the link length and carrier frequency. Separated antennas require separate transceivers, which result in increased phase noise effects. Separate antennas may not be practical at a particular location due to zoning or physical mounting constraints. In addition, in such systems each antenna at the receiver receives signals from all transmitting antennas, with approximately the same power, requiring sophisticated equalization and decoding techniques.

One promising technique for increasing MMW spectral efficiency is dual polarity transmission, described in Amitay above. Dual polarity transmission is a form of a multiple antenna system, where two antennas are used at each side of the point-to-point link. In this case channel discrimination is achieved by transmitting at orthogonal polarizations, commonly known as vertical (V) and horizontal (H) polarizations. In such a system, the V and H antennas can be combined into a single physical antenna known as a dual-polarized antenna, which enables the system to utilize part of the same radio elements for the two transmissions.

Dual polarity transmission systems have successfully been used in lower-frequency microwave radio systems to improve spectral efficiency. However, the lower frequencies are not affected by rain fade, which is the primary cause of fading in MMW channels. Rain attenuates the H polarization more than the V polarization, a phenomenon due to the flattening (lengthening in the H plane) of raindrops as they fall to earth. Existing dual polarity coding systems created for microwave links code separately for the two polarities, meaning the weaker polarity (H) dictates the link performance (achievable link capacity). In addition, the reflection of electromagnetic waves from a surface depends on the polarization, thus in some scenarios the two polarizations can experience different multipath effects. There is thus a need for a coding system that combines (in some way) the two polarities, and that can therefore exploit the diversity of the channels in favor of link capacity. Asymmetric modulations and joint interleaving and coding exploit the diversity between the channels and increase the overall transmission rate significantly.

TERMS AND NOTATIONAL CONVENTIONS

In the discussion of the present invention, the following terms and notational conventions are used:

| | |
|---|---|
| $\eta_H$ | refers to the spectral efficiency of the coded modulation in the H channel (horizontal polarization), in bits per channel symbol |
| $\eta_V$ | refers to the spectral efficiency of the coded modulation in the V channel (vertical polarization), in bits per channel symbol |
| $R_{fixed}$ | refers to the raw (uncoded) data rate of the fixed-rate payload to be transported by the MMW system |
| $R_{var}$ | refers to the current value (determined by weather conditions) of the raw data rate of the variable-rate payload to be transported by the MMW system |
| $R_{MAC}$ | refers to the raw data rate of the media access control (MAC) channel payload to be transported by the MMW system |
| $\eta_{fixed}$, $\eta_{var}$, $\eta_{MAC}$ | refer each to the corresponding R (fixed, var, mac, as defined above), divided by the symbol rate of the system. The symbol rate is exactly the same for both polarizations, H and V. |
| $\eta_k$ | (i.e., subscripted versions of $\eta$ where k = 1–6) refers to the partial spectral efficiencies of the coded modulation, in bits per channel symbol, allocated to the three coded and interleaved payloads, and summing to equal the total spectral efficiencies of the system $\eta_V + \eta_H$. $\eta_1$, $\eta_3$, and $\eta_5$ are the partial spectral efficiencies of $\eta_H$ allocated to $R_{fixed}$, $R_{var}$, and $R_{MAC}$ respectively, and $\eta_2$, $\eta_4$, and $\eta_6$ are the partial spectral efficiencies of $\eta_V$ allocated $R_{fixed}$, $R_{var}$, and $R_{MAC}$ respectively |
| t | refers to the correction capability of a Reed-Solomon (RS) machine |
| t_fixed | refers to the correction capability of the RS machine for the fixed-rate payload |
| t_var | refers to the correction capability of the RS machine for the variable-rate payload |
| t_mac | refers to the correction capability of the RS machine for the MAC channel payload |
| t_max | refers to the maximum value of t supported by the implementation of the RS machine |
| I | interleaver depth (number of rows). Interleaver width is the block codeword length (number of columns). |

SUMMARY OF THE INVENTION

The present invention discloses a method and system for improving the spectral efficiency of a millimeter wave communication system while exploiting the diversity of the two channels to maximize link capacity and reliability. The method employs dual polarity transmission with a dual polarity modulation and coding system.

According to the present invention there is provided a method for efficient dual polarity transmission of a millimeter wave data stream of overall rate $R_{fixed}+R_{var}+R_{MAC}$ through two channels of polarities H and V, comprising the steps of: determining asymmetric H and V transmission powers such that the overall rate $R_{fixed}+R_{var}+R_{MAC}$ is maximized, and determining asymmetric $\eta_H$ and $\eta_V$ spectral efficiencies correlated with the asymmetric H and V transmission powers.

According to the present invention there is provided a system for efficient dual polarity transmission of a millimeter wave data stream of overall rate $R_{fixed}+R_{var}+R_{MAC}$ through two channels of polarities H and V, comprising, at least one block coder operative to produce an outer block code, at least one trellis coder operative to produce an inner trellis code, at least one interleaver connected to the block coder and operative to spread error bursts in channel symbols introduced by the at least one trellis coder among blocks of the block code, and mapping means to achieve a maximal effective interleaver depth in the interleaver.

A first innovative feature of the method of the present invention is a determination of asymmetrical modulation and asymmetrical transmission power to increase the overall link capacity.

The parameters that determine the spectral efficiencies that can be supported by each of the channels, H and V, are the mean square errors (MSEs) that are achieved at the input to the trellis (or MLCM) decoders, after conventional filtering and equalization. The MSE at the trellis decoder of each polarization channel (H or V) is a function of the thermal signal-to-noise (SNR) of that channel, and the level of interference from the other polarization. For given link length and weather conditions, the attenuation and interference at each channel can be computed from e.g., ITU-R P530.10, and the achievable MSE after inline and cross equalization (interference cancellation) at each channel can be determined from these data.

The MSEs for the H and V channels determine the maximal spectral efficiencies ($\eta_H$ and $\eta_V$) that can be supported by each channel, given the coding system in use. As the spectral efficiencies can take only a finite set of values, there usually is a MSE margin left in each of the channels. The transmission powers in V and H are now changed to maximize the overall transmission rate.

For example, the power in the V channel may be reduced to decrease the MSE margin in the V channel. Consequently, the interference level in the H channel is reduced by the same amount. This reduction in V power is used to re-evaluate the MSE in H, and the spectral efficiency of the H channel is increased from $\eta_H$ to $\eta_H'$, while $\eta_V$ is set equal to $\eta_V'$. The other direction (reducing the power in the H channel, thus reevaluating the MSE in the V channel, etc) is also possible, depending on the specific channel scenario. The chosen spectral efficiencies can support the total payload capacity $R_{fixed}+R_{var}+R_{MAC}$.

A second innovative feature of the invention is the technique for allocation of the partial spectral efficiencies of $\eta_H$ and $\eta_V$ to the three categories of payload traffic. The allocation is done in such a way as to ensure that the capacity of the two channels is fully utilized given the channel conditions, and also so that subsequent interleaver structures and mappings to the constellations can be constructed as described below.

A third innovative feature of the invention is the construction of the rows and columns of the interleavers for each payload category. This construction ensures that each single symbol in the Reed-Solomon code (or any other block code used) is either fully transmitted/received in the H polarization or in the V polarization. This has the effect of concentrating inner code bit error bursts into a single code symbol rather than in multiple code symbols. Furthermore, with this technique the interleavers are filled in a manner such that columns are also either fully transmitted/received in the H polarization or in the V polarization.

A fourth innovative aspect of the invention is that each constellation symbol consists of bits from $R_{fixed}$, $R_{var}$, and $R_{MAC}$ in proportion to $\eta_1$, $\eta_3$, and $\eta_5$ for transmission in the H polarity and to $\eta_2$, $\eta_4$, and $\eta_6$ for transmission in the V polarity. Therefore it can be seen that the partial spectral efficiencies $\eta_k$ not only drive the allocation of payload bits to the H and V channels but also drive the average composition of each symbol that is transmitted on each channel.

One result of the invention is increased overall spectral efficiency. Another result is a dual polarity coding system and method that fills the interleavers and builds the transmitted constellation symbols in such a manner to achieve an effective higher interleaver depth, and therefore superior burst error performance. This contrasts with separate coding systems for each polarity. In addition, each word of the block code is composed of bits coming from the H channel and bits coming from the V channel, thus resulting in total BER lower than the BER that can be achieved in systems where the two channels are coded separately.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawings. The drawings are intended to be illustrative, not limiting. Although the invention will be described in the context of these preferred embodiments, it should be understood that it is not intended to limit the spirit and scope of the invention to these particular embodiments.

DETAILED DESCRIPTION OF THE INVENTION

The present invention is of a method for asymmetrical modulation and transmission power in MMW, combined with a corresponding asymmetrical coding and interleaving strategy.

Figure 1:
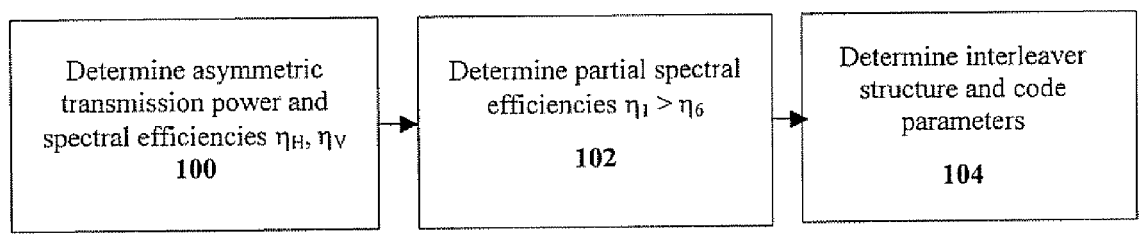
FIG. 1 shows in a block diagram the main steps of the method of the present invention.

In dual polarity systems there is always leakage between the channels, due to rain and antennas. As a result of the leakage and the difference between attenuations, the cross polarization interference (XPI) at the H channel is higher than the XPI at the V channel. For example, since the received H power is much lower than the received V power, a small reduction in the V transmission power reduces the XPI at H. Thus, a significant increase of possible transmission rate at H can be achieved without sacrificing rate at V. The other direction is also possible: sometimes a small decrease in transmission power of H can increase the possible transmission rate in V. FIG. 1 shows in a block diagram the main steps of the method of the present invention. The method includes the steps of determining the asymmetrical modulation and asymmetrical transmission power to increase the overall link capacity, as well as determining asymmetric $\eta_H$ and $\eta_V$ spectral efficiencies correlated with the asymmetric H and V transmission. This is shown in block 100 in FIG. 1. The method further includes the step of determining partial spectral efficiencies $\eta_1$ to $\eta_6$ shown in block 102. These partial spectral efficiencies $\eta_1$ to $\eta_6$ are allocated between the $\eta_H$ and $\eta_V$ spectral efficiencies to achieve a maximal effective interleaver depth. Finally, the method includes determining, in an inventive scheme, the interleaver structure and code block parameters, as shown in block 104. The asymmetric coding and interleaving parameters are related to the asymmetric $\eta_H$ and $\eta_V$ spectral efficiencies.

The parameters that determine the spectral efficiencies that can be supported by each of the channels, H and V, are the mean square errors (MSEs) that are achieved at the input to the trellis (or MLCM) decoders, after conventional filtering and equalization. The MSE at the decoder of each polarization channel (H or V) is a function of the thermal SNR of that channel, and the level of interference from the other polarization. For a given link length and weather conditions (climate zone), the attenuation and interference at each channel can be computed from e.g., ITU-R P530.10, and the achievable MSE after inline and cross equalization (interference cancellation) at each channel can be determined from this data. These numbers determine the maximal spectral efficiencies that can be supported by each channel, given the coding system in use ($\eta_H$ and $\eta_V$). As the spectral efficiencies can take only a finite set of values, there usually is an SNR margin left in each of the channels. The transmission powers in V and H are now changed to maximize the overall transmission rate. For example, the power in V may be reduced to decrease the margin in V. Consequently, the interference level in H is reduced by the same amount. This reduction in V is used to re-evaluate the MSE in H, and the spectral efficiency of the H channel is increased from $\eta_H$ to $\eta_{H'}$, while $\eta_V$ is set equal to $\eta_{V'}$. The other direction is also possible, depending on the specific channel scenario. The chosen spectral efficiencies can support the total payload capacity $R_{fixed} + R_{var} + R_{MAC}$.

Figure 2:
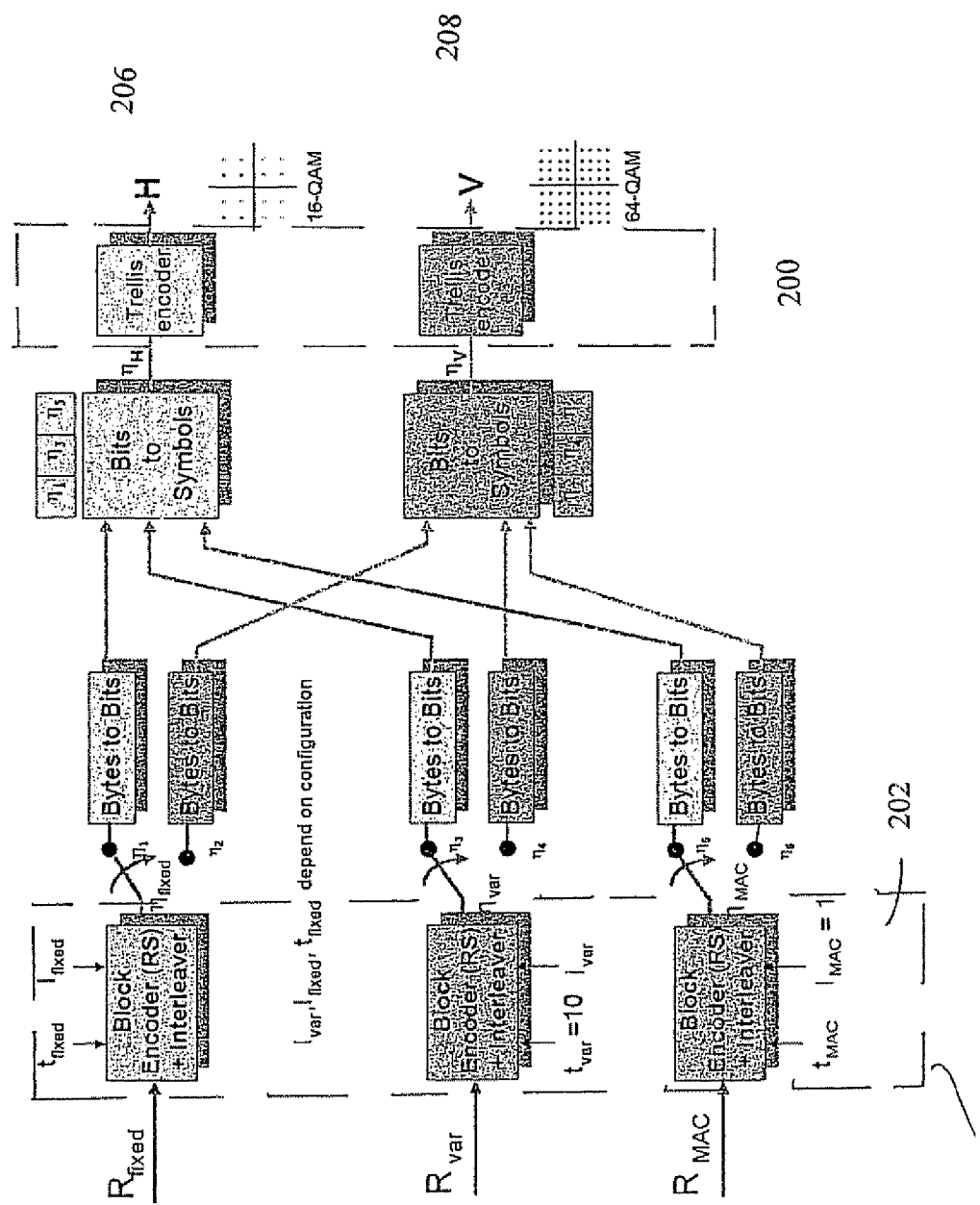
FIG. 2 shows a preferred embodiment of the inventive coding and interleaving scheme in the method of the present invention.

A preferred embodiment of the inventive coding and interleaving scheme is depicted in FIG. 2. The figure shows, in general blocks, a system comprising an inner trellis coder 200 (marked "Trellis Encoder"), an outer block coder 202 (marked "Block Encoder"), and an interleaver 204 implemented between the two (and marked "Interleaver" and combined in the same box with the "Block Encoder" in FIG. 2). Block coder 202 is used for coding a stream of data, of overall rate $R_{fixed}$ (fixed rate services)+$R_{var}$ (variable rate services)+$R_{MAC}$ (control rate), across two channels 206 and 208, of respective polarizations H and V, in a manner that will exploit the diversity between the two channels in favor of the total link capacity.

The code is concatenated, consisting of inner trellis code (in coder 200) and an outer block code (in coder 202), which can be a RS, BCH, LDPC or any other block coding scheme. We will refer throughout this description to the block code to be RS; however, this is not meant to be restrictive. In particular, we assume the use of a RS(255, 255−t) code. The reason for adding an interleaver (common practice also in classical systems) lies in the nature of errors in the output of the trellis decoder. Trellis codes introduce burst errors into the data. The length of the burst of errors is a random variable, whose statistics are determined by the trellis machine. The errors of the trellis decoder are supposed to be corrected by the block code. However, block codes cope with evenly spread errors better than with burst errors. The purpose of the interleaver is to spread the burst among a few blocks of the block code, thus facilitating correction of the trellis errors by the last stage, the block code decoder. This is achieved by choosing an interleaver depth larger than the error bursts that determine performance of the coding scheme. Such a choice guarantees that most of the bursts will not spread more than one interleaver column, thus inducing at most one error in each RS block. Therefore, each RS code word will, effectively, see the errors as evenly spread.

The length of a trellis burst is determined by its trellis machine. For a given trellis machine, trellis codes of various spectral efficiencies (information bits per channel symbol) can be constructed by changing the constellation size and accordingly changing the number of parallel transitions (uncoded bits) of the trellis scheme. For a given trellis machine, the number of parallel transitions has almost no effect on the burst length statistics. Thus, trellis codes based on the same trellis machine have the same burst length in terms of channel symbols. An important assumption in this invention is that all trellis codes involved produce error bursts of the same length in channel symbols. As said above, one possible way to achieve this is to use the same trellis machine for all codes involved. However, any other set of trellis codes (not necessarily based on the same trellis machine) that achieve the same burst statistics will also do. Thus the invention is not restricted to such. We assume throughout that the effective burst length in channel symbols is less than $k*\eta$, where k is a constant depending on the trellis machine, and $\eta$ is the corresponding spectral efficiency. By the discussion above, an interleaver of depth at least $k*\eta$ suffices to cope with bursts in a manner that will enable the RS decoder to decode reliably.

Referring back to FIG. 2, the H and V data streams, marked respectively "H Stream" (and associated with a constellation marked 16-QAM) and "V Stream" (associated with a constellation marked 64-QAM) are passing trellis coding separately. As defined above, $\eta_H$ and $\eta_V$ are the spectral efficiencies of the coded modulations of H and V channels respectively i.e., bits per channel use, or per channel symbol, after correcting for the trellis redundancy. Examples for possible range of values of these parameters are: 1 to 7 (if we use QPSK to 256QAM constellations with a 2D trellis machine) in steps of 1, or 1.5 to 7.5 (if we use QPSK to 256 QAM constellations with a 4D trellis machine) in steps of 1.

The constellations sizes and the trellis machine determine $\eta_H$ and $\eta_V$. Each constellation is chosen to be the maximal size that can still be decoded at the output of the corresponding channel. Note that since weather is the prime factor limiting channel performance in polarized MMW, and since it affects the H and V waveforms differently, we will generally have $\eta_H \neq \eta_V$. The total requested rate $R_{fixed} + R_{var} + R_{MAC}$ is such that it can be supported by the overall spectral efficiency $\eta_H + \eta_V$.

All the partial spectral efficiencies $\eta_1$ to $\eta_6$ are distributed between $\eta_H$ and $\eta_V$ as explained below (note that we must end up with $\eta_H = \eta_1 + \eta_3 + \eta_5$, $\eta_V = \eta_2 + \eta_4 + \eta_6$). If the target is to increase effective interleaver depth and reduce overall bit error rate (BER), then the idea in allocating the partial spectral efficiencies is that each of the rates $R_{fixed}$, $R_{var}$, and $R_{MAC}$ will be as close as possible to being evenly distributed between the H and V channels. However, since in general $\eta_H \neq \eta_V$, we cannot distribute all the three requested rates evenly. As even distribution gets the maximal benefits of diversity, we start with the stream that should get the maximal protection, and end up with the lower one. In what follows, the order of allocation is $R_{MAC}$ (control channel), $R_{fixed}$ (fixed rate services), and then $R_{var}$ (variable rate services). However, this invention is not restricted to that specific order. In addition, this invention is not restricted to such allocation strategy, and any strategy that satisfies the restrictions on the sum of partial spectral efficiencies can be used according to this invention.

The equations for calculating the partial spectral efficiencies that achieve maximal effective interleaver depth are given below. Usually there is a hardware constraint on the resolution in which the partial spectral efficiencies can be implemented. In the equations below, the quantization of the spectral efficiencies due to this hardware constraint is denoted by the function Q(.)

$$\eta_5 = Q(\eta_{MAC}/2)$$

$$\eta_6 = \eta_{MAC} - \eta_5 \quad \quad 1)$$

$$\eta_1 = Q(\eta_{fixed}/2) \text{ if } \eta_H - \eta_5 > Q(\eta_{fixed}/2), \quad \quad 2)$$
$$= \eta_H - \eta_5 \text{ otherwise.}$$

$$\eta_2 = \eta_{fixed} - \eta_1 \quad \quad 3)$$

$$\eta_3 = \max[0, \eta_H - (\eta_1 + \eta_5)] \quad \quad 4)$$

$$\eta_4 = \eta_V - (\eta_2 + \eta_6) \quad \quad 5)$$

A comment on the last two equations: by construction and by the fact that V is the stronger channel, it is guaranteed that: $\eta_V - (\eta_2 + \eta_6) >= 0$, and also: $\eta_3 + \eta_4 = \eta_{var} >= 0$.

The number t (check bytes) of each RS machine is determined according to:

t_fixed (of fixed rate RS blocks): the maximal t that will still get the promised fixed rate.

t_var (of variable rate RS blocks): as the variable rate is not supposed to be guaranteed, t_var can be increased up to t_max.

t_mac (of control RS blocks): fixed, in this example t_mac=t_max.

Figure 3:
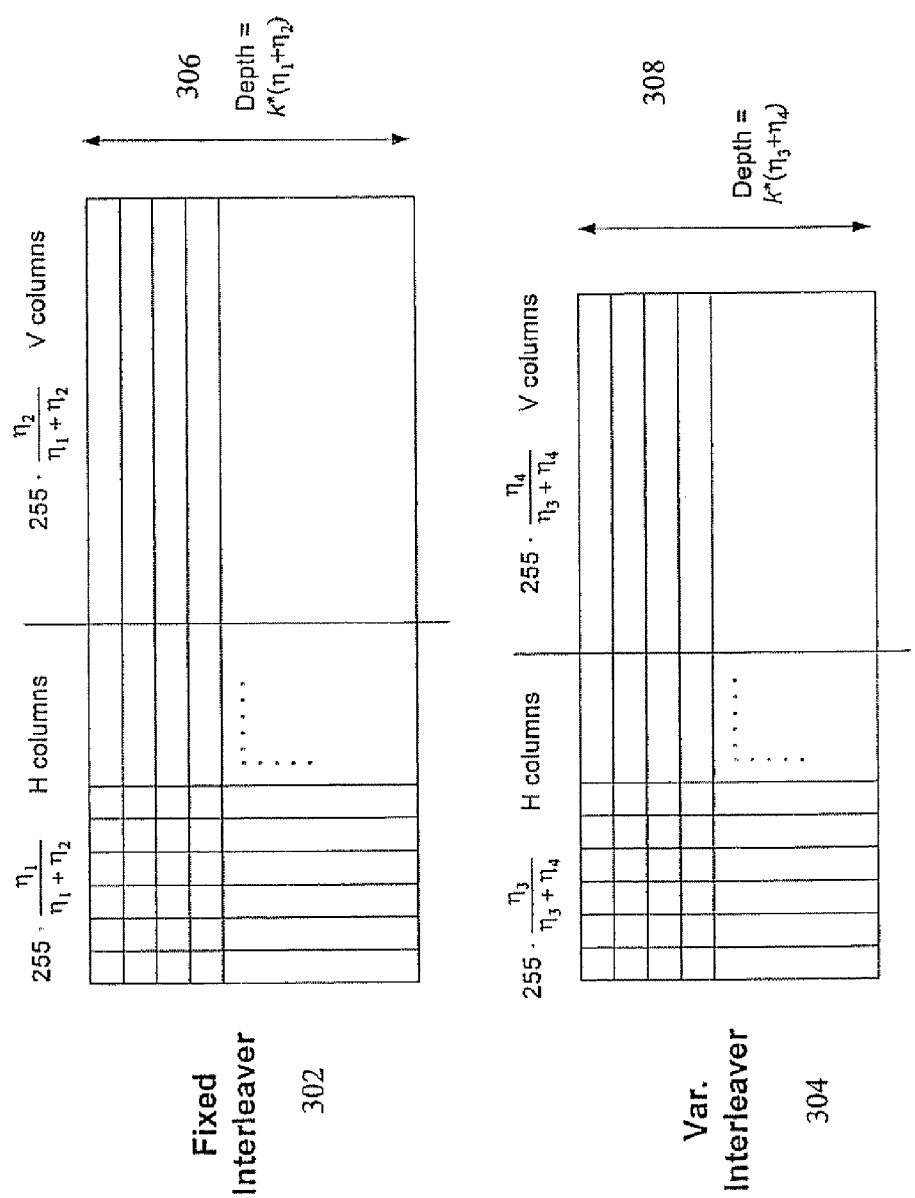
FIG. 3 is a schematic diagram of an interleaver structure according to the present invention.

FIG. 3 shows the structure of two interleavers, a fixed interleaver 302 for stream $R_{fixed}$ and a variable interleaver 304 for stream $R_{var}$ and the mapping to the constellation. The structuring and mapping are done as follows:

a) The depth of each interleaver (i.e., number of rows) is chosen to be at least k*(corresponding $\eta$). That is, a depth 306 of $R_{fixed}$ interleaver 302 is at least k*$\eta_{fixed}$, and a depth 308 of $R_{var}$ interleaver 304 is at least k*$\eta_{var}$, where k is an integer.

b) When constructing the rows of $R_{fixed}$ interleaver 302, the ratio between the number of bytes coming from the H stream and the number of bytes coming from the V stream is like $\eta_1$ to $\eta_2$. The important point is that each single byte in the RS code is either coming in full from H, or coming in full from V. There is no mix between H and V at a single byte level. This is important because for the RS code, a single erroneous bit in a byte is exactly the same as 8 erroneous bits in a byte—only byte errors count. Therefore one would not like to spread the trellis bursts between bytes; instead, it is preferable to put as many bit (burst) errors in a single byte.

c) The distribution of the bytes inside each interleaver in FIG. 3 is done as follows: the writing into the interleaver is done in rows, in such a manner that there is a bulk of columns from one polarization, and a bulk of columns from the other. So in $R_{fixed}$ interleaver 302 under the assumption that we use an RS(255, 255-t) block code, there are 255*$\eta_1$/($\eta_1+\eta_2$) columns from H, and the remaining are from V.

Similar equations apply for $R_{var}$ interleaver 304: there are 255*$\eta_3$/($\eta_3+\eta_4$) columns from H, and the remaining columns are from V. Note that this number need not be an integer. To illustrate how to cope with this, let us look at the fixed rate interleaver 302. Its depth is k*$\eta_{fixed}$, where k is an integer and $\eta_{fixed}=\eta_1+\eta_2$. Thus the number of code symbols (bytes, in the present example) coming from H is 255*k*$\eta_1$. The constant k can be chosen according to the hardware resolution of the $\eta$ parameters (denoted in the equations above by the function Q), so that this number is always an integer. Therefore, at most one column will mix H and V bytes. Since the constant k is the same for both fixed rate and variable rate interleavers, this argument holds also for the variable rate interleaver.

d) Each constellation symbol in H, comprised of $\eta_H$ (info+RS) bits, is on the average composed of $\eta_1$ bits from $R_{fixed}$, $\eta_3$ bits from $R_{var}$, and $\eta_5$ bits from $R_{MAC}$. Similarly for $\eta_V$, each V symbol is composed on the average of $\eta_2$ bits from $R_{fixed}$, $\eta_4$ bits from $R_{var}$, and $\eta_6$ bits from $R_{MAC}$. That is to say, the partial spectrum efficiencies in this case are not only the ratios between rates in a "general" meaning, but they also have a meaning in the symbol level. We gain here two advantages, with respect to a system that codes and interleaves each of the streams separately: 1) increased effective interleaver depth, and 2) exploiting diversity to reduce system BER at working point. These two advantages are explained as follows:

Effective Interleaver Depth

By this structure, we gain an effective higher interleaver depth. This can be seen it as follows: a block interleaver, in general, is filled in RS rows (k*$\eta$ rows in our case) and is being read (into the channel or into the trellis) by columns. Therefore trellis errors are spread in columns. When a burst is longer than the number of rows, it goes to the next column of the interleaver, thus putting more than one erroneous byte in the RS code.

Let us look what happens to a burst of length L that occurs in H. Its length in bytes is L*$\eta_H$/8. According to our structure, L*$\eta_1$/8 bytes are going to the $R_{fixed}$ interleaver, and L*$\eta_3$/8 bytes are going to the $R_{var}$ interleaver. Thus, to cope with bursts, the fixed interleaver should be of depth k*$\eta_1$, and the variable interleaver should be of depth k*$\eta_3$. However, their depths are k*($\eta_1+\eta_2$) and k*($\eta_3+\eta_4$), respectively, and therefore we gained an effective interleaver depth higher than the real physical depth. The gain in depth is $$g = \min(C\_1, C\_2), \text{ where}$$

$$C\_1 = (\eta_1 + \eta_2)/\eta_1,$$

$$C\_2 = (\eta_3 + \eta_4)/\eta_3.$$

This gain can be exploited by reducing the physical interleavers depths, by a factor of g, thus reducing delay in the system.

Two points are crucial for this arrangement to work: 1) the interleavers are filled in a manner that the ratio of code symbols from H to code symbols of V in one row equals the ratio of respective $\eta$'s (this is point "c" above), and 2) each constellation symbol, on the average, is divided by the ratio of partial spectral efficiencies. For example, in the H polarity, each constellation symbol (of $\eta_H$ information bits) is divided, on average, into $\eta_1$ bits (going to $R_{fixed}$) and $\eta_3$ bits (going to $R_{var}$). Note that this guarantees that the argument—of distributing the whole burst between interleavers—works even though the number of H columns in each interleaver may not be equal (this is point "d" above).

EXAMPLE 1

This example illustrates the distribution of the η parameters and the construction of the interleaver columns. We assume that the hardware resolution in implementation of the η parameters is 0.125 bits, and t_max=10.

Assume the required rates are $R_{fixed}$=155 Mbps, $R_{var}$=105 Mbps, and the control rate $R_{mac}$=8 Mbps. The symbol rate at the channel is 40 Msps The total spectral efficiency should be more than (155+105+8)/40=6.7 (in order to allow for RS redundancy); hence the total spectral efficiency is set to 7. We choose $\eta_V$=4 and $\eta_H$=3. These are the spectral efficiencies after compensating for the trellis redundancies. We assume that the actual physical channel conditions can support these constellations plus the trellis coding. Thus $\eta_{fixed}+\eta_{var}+\eta_{mac}$=7.

Determining $\eta_{mac}$: t_mac=$t_{max}$=10. Therefore the spectral efficiency must satisfy $\eta_{mac}$*245/255*40>8. At the specified resolution, we get $\eta_{mac}$=0.25.

Determining $\eta_{var}$: Here t_var=10. Thus considerations similar to the above yield $\eta_{var}$=2.75.

Determining t_fixed: The spectral efficiency left for fixed rate is $\eta_{fixed}$=7−0.25−2.75=4. Therefore t_fixed is the maximal value of t for which the following equation is still satisfied:

40*4>=155*255/(255−t)

Hence we get: t_fixed=6.

Determining $\eta_1$ to $\eta_6$: By the equations for the η parameters, and assuming that the hardware resolution in implementing η is 0.125, we get:

$\eta_1=\eta_2=2$, $\eta_3=0.875, \eta_4=1.875$ $\eta_5=\eta_6=0.125$.

Diversity

Due to the asymmetry in channel conditions between H and V, there will always be a difference in performance (in terms of symbol error rate) between the H and V channels. This will happen even if the determination of the H and V constellations is driven to balance performance between the channels. This is because the spectral efficiency of constellations is always in steps of 1 bit, incurring a resolution of 3 dB in determining the working point of each channel. Thus even if we choose H and V constellations to balance the working point, a difference of up to 3 dB can occur between the working point of H and that of V. This imbalance can increase in cases where there are hardware or other limitations in choosing the constellations.

We define the following quantities:

margin_*h*=(*SNR* at *H* receiver)−(required *SNR* for decoding the *H* trellis code)

margin_*v*=(*SNR* at *V* receiver)−(required *SNR* for decoding the *V* trellis code)

For the system to work, both margins should be positive. A perfectly balanced system is such that margin_h=margin_v. As explained above, in many cases this cannot be achieved. A good design is such that minimizes the difference between margin_h and margin_v.

We define the "weak channel" to be the channel with the smallest margin. Note that although H suffers from higher attenuations, an optimal design for a given scenario can result in V being the weak channel. This depends on the actual channel conditions and on the range of constellations that the hardware implementation can support.

As the margins, in general, cannot be made exactly equal, when coding separately for H and V channels the block code of the weak channel suffers from a much higher error rate at its decoder input than that of the strong channel. Note that reducing the error correction capability of the strong channel (with respect to the weak), i.e., reducing t, will not result in a considerable rate increase, as t is usually less than 1 percent of the block length. Thus the overall system performance, or the overall system margin, is determined (in separately coded system) by that of the weak channel:

overall margin=min[margin_h, margin_v]

In this invention, the interleaver mixes, in the RS code, bytes composed of symbols coming only from the strong channel, with bytes composed of symbols coming only from the weak channel. The ratio of this mix is described in point "c" above. As one channel can be stronger than the other, each RS code sees, practically, a bulk of completely clean bytes (coming from the strong channel) and a bulk of bytes coming from the weak channel. The error rate of the weak bytes, and their ratio in the block, determine BER at working point.

EXAMPLE 2

The following example illustrates the BER gain. Assume that at a given link distance and weather condition, there is a 5.5 dB difference between signal power received at H and signal power received at V. In particular, assume that SNR at H is 13.9 dB, and SNR at V is 19.3 dB. Thus we can use 8 QAM at H, and 16 QAM at V. (Note that since the difference is less than 6 dB, the best balance can be achieved by constellations that differ in 1 bit at most.) We now compare a conventional system, where H and V are RS coded separately, to our system, where H and V are interleaved and coded as described in the present invention.

1.1 Separate block coding of H and V: We start with the H channel. 8 QAM at a SNR of 13.8 dB results in a byte error rate of 5e-3 at the input of the RS decoder. Assuming we use RS(255, 245), this results in a total BER of 2e-9 at H. Regarding the V channel, 16 QAM at a SNR of 19.3 dB results in a byte error rate of 1e-4 at the input of the corresponding RS decoder. Thus it is clear that the H channel determines the overall BER of the system, namely 2e-9.

1.2 Joint interleaving of H and V: At a code word of the RS(255, 245) code in use, we have 145 bytes coming from V at a byte error rate of 1e-4, and 110 bytes coming from H at a byte error rate of 5e-3. The resulting BER at the output of the RS decoder is 1e-11. Thus, our joint interleaving scheme reduces the overall BER by a factor of 5e-3 relative to a system with separate interleaving and coding.

The invention has now been described with reference to specific embodiments. Other embodiments will be apparent to those of ordinary skill in the art.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for efficient dual polarity transmission of a millimeter wave data stream of overall rate $R_{fixed} + R_{var} + R_{MAC}$ through two channels of polarities H and V, comprising the steps of:
   a. determining asymmetric H and V transmission powers such that the overall rate $R_{fixed} + R_{var} + R_{MAC}$ is maximized, and
   b. determining asymmetric $\eta_H$ and $\eta_V$ spectral efficiencies according to said asymmetric H and V transmission powers.

2. The method of claim 1 further comprising determining asymmetric coding and interleaving parameters related to said asymmetric $\eta_H$ and $\eta_V$ spectral efficiencies.

3. The method of claim 1, wherein said step of determining asymmetric $\eta_H$ and $\eta_V$ spectral efficiencies includes allocating partial spectral efficiencies $\eta_1$ to $\eta_6$ between said $\eta_H$ and $\eta_V$ spectral efficiencies to achieve a maximal effective interleaver depth, said partial spectral efficiencies used in said interleaving.

4. The method of claim 1, wherein said step of determining asymmetric H and V transmission powers includes setting said respective powers based on the determination of mean square error data of each of the H and V channels at a respective H and V input trellis decoder, after conventional filtering and equalization.

5. The method of claim 3, wherein said step of allocating is preceded by the step of calculating said partial spectral efficiencies $\eta_1$ to $N_6$ according to $$\eta_5 = Q(\eta_{MAC}/2)$$

$$\eta_6 = \eta_{MAC} - \eta_5$$

$$\eta_1 = Q(\eta_{fixed}/2) \text{ if } \eta_H - \eta_5 > Q(\eta_{fixed}/2),$$

$$= \eta_H - \eta_5 \text{ otherwise.}$$

$$\eta_2 = \eta_{fixed} - \eta_1$$

$$\eta_3 = \max[0, \eta_H - (\eta_1 + \eta_5)]$$

$$\eta_4 = \eta_V - (\eta_2 + \eta_6)$$

where Q is a given quantization function.

6. The method of claim 5, wherein said step of allocating includes allocating said partial spectral efficiencies according to $$\eta_H = \eta_1 + \eta_3 + \eta_5$$

$$\eta_V = \eta_2 + \eta_4 + \eta_6.$$

7. The method of claim 2, wherein said step of determining asymmetric coding and interleaving parameters further includes structuring a fixed interleaver and a variable interleaver, and mapping respective interleaver symbols.

8. The method of claim 7, wherein said structuring includes structuring said fixed interleaver to have a fixed interleaver number of rows of at least $k*\eta_{fixed}$, and structuring said variable interleaver to have a variable interleaver number of rows of at least $k*\eta_{var}$ where k is a machine dependent constant.

9. The method of claim 7, wherein said mapping of respective interleaver symbols includes mapping each symbol in said H steam comprised of $\eta_H$ bits to include on average $\eta_1$ bits from said $R_{fixed}$, $\eta_3$ bits from said $R_{var}$ and $\eta_5$ bits from said $R_{MAC}$, and mapping each symbol in said V stream comprised of $\eta_V$ bits to include on average $\eta_2$ bits from said $R_{fixed}$, $\eta_4$ bits of said $R_{var}$ and $\eta_6$ bits of said $R_{MAC}$.

10. The method of claim 2, wherein said coding includes coding according to a Reed Solomon (RS) code.

11. The method of claim 10, wherein said RS code is an RS(255, 255−2t_fixed) block code, wherein said constructing of said interleaver rows includes distributing RS(255, 255−2t_fixed) block code symbols inside a codeword such that said fixed interleaver includes $255*\eta_1/(\eta_1+\eta_2)$ symbols from the H data, and $255*\eta_2/(\eta_1+\eta_2)$ symbols from the V data, and wherein said variable interleaver includes $255*\eta_3/(\eta_3+\eta_4)$ symbols from the H data, and $255*\eta_4/(\eta_3+\eta_4)$ symbols from the V data.

12. A system for efficient dual polarity transmission of a millimeter wave data stream of overall rate $R_{fixed} + R_{var} + R_{MAC}$ through two channels of polarities H and V, comprising:
   a. at least one block coder operative to produce an outer RS(255, 255−2t_fixed) Reed Solomon block code:
   b. at least one trellis coder operative to produce an inner trellis code:
   c. at least one interleaver connected to said block coder and operative to spread error bursts in channel symbols introduced by said at least one trellis coder among blocks of said Reed Solomon block code, wherein said at least one interleaver includes a fixed interleaver for a stream $R_{fixed}$, and a variable interleaver for a steam $R_{var}$, wherein said fixed interleaver is structured to have a fixed interleaver number of rows of at least $k*\eta_{fixed}$, that include $255*\eta_1/(\eta_1+\eta_2)$ symbols from the H data, and $255*\eta_2/(\eta_1+\eta_2)$ symbols from the V data, and wherein said variable interleaver is structured to have a variable interleaver number of rows of at least $k*\eta_{var}$ that include $255*\eta_3/(\eta_3+\eta_4)$ symbols from the H data, and $255*\eta_4/(\eta_3+\eta_4)$ symbols from the V data, where k is a machine dependent constant; and
   d. mapping means to achieve a maximal effective interleaver depth in said interleaver, wherein said mapping means include means to map bits to channel symbols separately for the H and V channels, whereby each said H symbol includes $\eta_H$ bits that include on average $\eta_1$ bits from said $R_{fixed}$, $\eta_3$ bits from said $R_{var}$ and $\eta_5$ bits from said $R_{MAC}$, and whereby each said V symbol includes $\eta_V$ bits that include on average $\eta_2$ bits from said $R_{fixed}$, $\eta_4$ bits of said $R_{var}$ and $\eta_6$ bits of said $R_{MAC}$.

* * * * *